Feb. 23, 1937.   L. E. STEINER   2,071,859
MAGNETIC TRANSFER DEVICE
Filed March 16, 1936    2 Sheets-Sheet 1
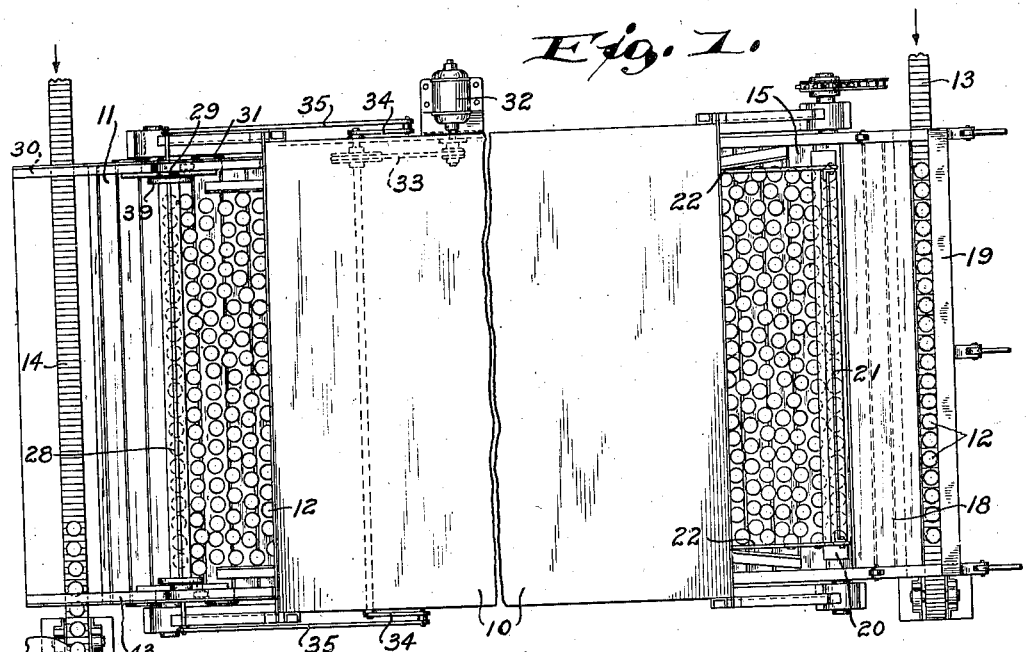
Fig. 1.
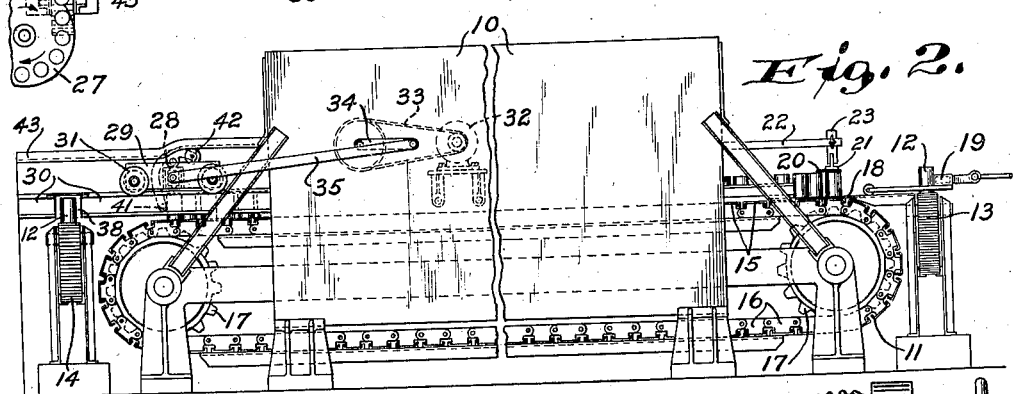
Fig. 2.
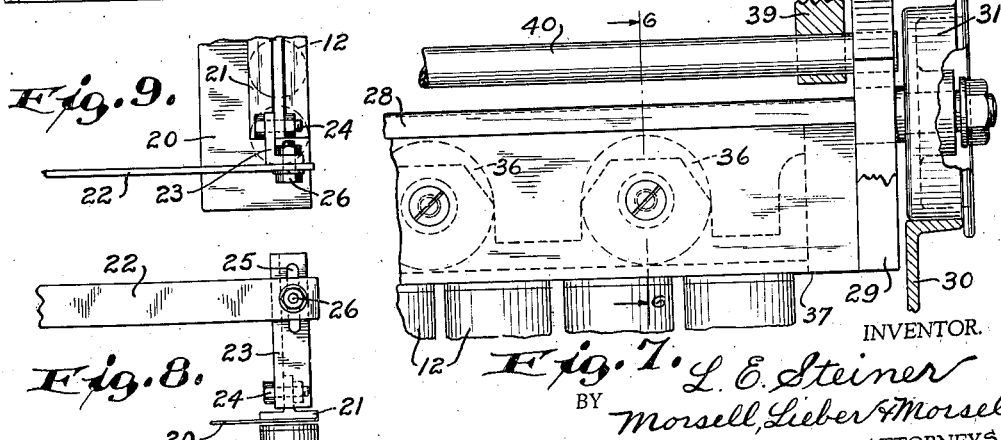
Fig. 9.   Fig. 8.   Fig. 7.
INVENTOR.
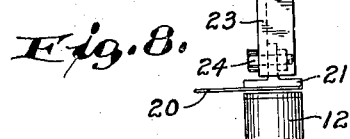
L. E. Steiner
BY Morsell, Lieber & Morsell
ATTORNEYS.

Feb. 23, 1937.   L. E. STEINER   2,071,859
MAGNETIC TRANSFER DEVICE
Filed March 16, 1936   2 Sheets-Sheet 2
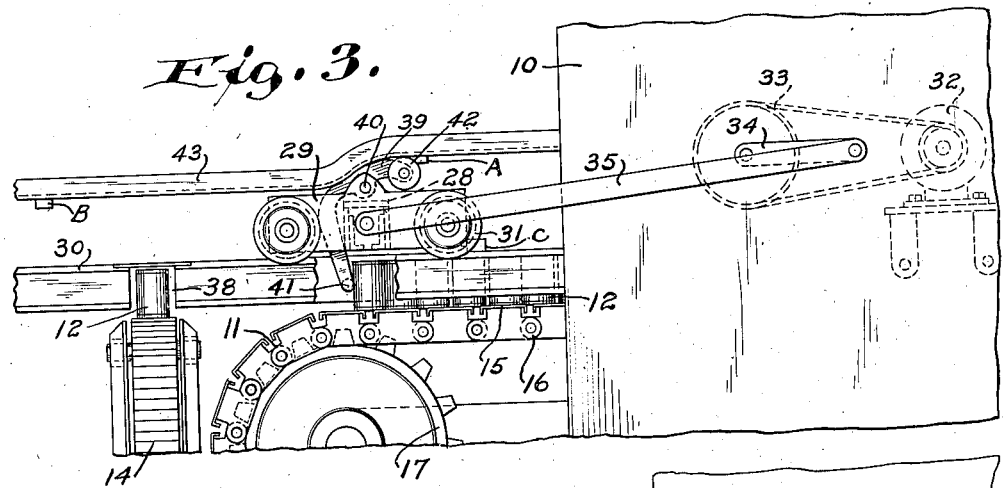
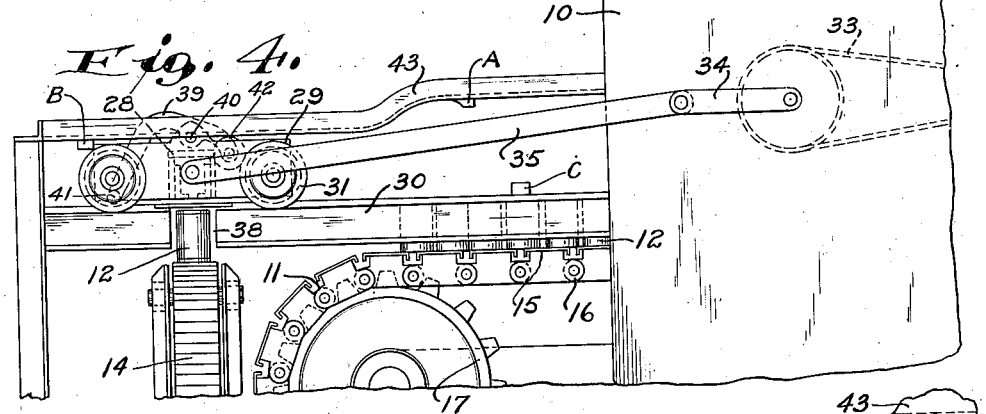
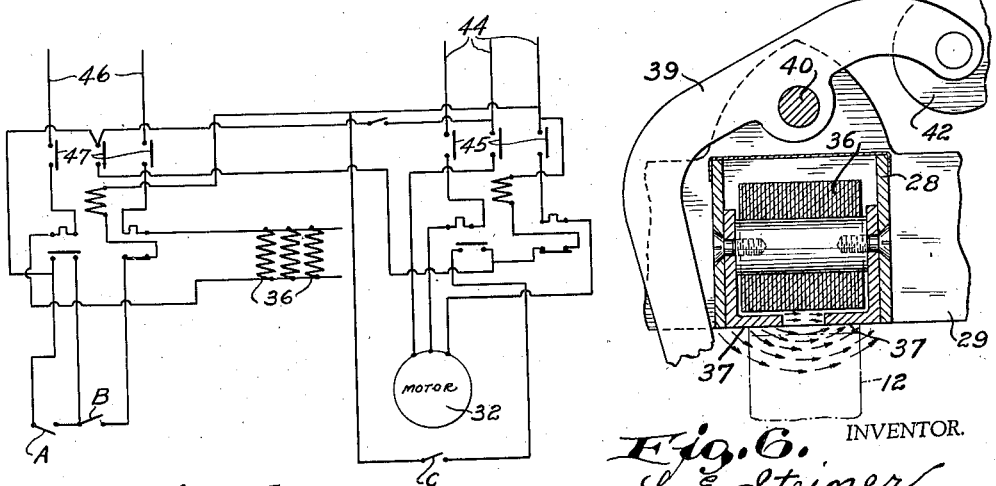
INVENTOR.
L. E. Steiner
BY Morsell, Liebert & Morsell
ATTORNEYS.

Patented Feb. 23, 1937

2,071,859

UNITED STATES PATENT OFFICE 2,071,859

MAGNETIC TRANSFER DEVICE

Leo E. Steiner, Milwaukee, Wis.

Application March 16, 1936, Serial No. 69,034

17 Claims. (Cl. 198—32)

The present invention relates in general to improvements in the art of transferring objects from one place to another, and relates more specifically to improvements in the construction and operation of magnetic transfer devices especially adapted to transfer successive rows of objects such as metallic containers from one conveying device to another.

Generally defined, an object of the present invention is to provide an improved magnetic transfer device which is extremely simple in construction, and which is moreover highly efficient in operation.

In the art of packing and treatment of certain commodities such as lager beer, it has recently become commercial practice to pack the beer in cylindrical metallic containers which after being sealed, are conveyed through a heat treating device such as a pasteurizer, and are subsequently permitted to cool preparatory to shipment and final consumption. The filling and capping machines have enormous capacity, and in order to enable the use of a relatively compact pasteurizer, the beer laden containers which are delivered single file from the closing machine, are preferably conveyed in successive transverse rows or groups of twenty or more individual packages, through the pasteurizing zone. The pasteurizer conveyor which is of transverse width sufficient to accommodate the rows or groups, advances through the heating zone at a rate sufficiently slow, so that segregated groups of the single file beer laden containers discharged from the closing machine, can be transferred in succession from the rapidly advancing single file conveyor to the pasteurizing conveyor. This transfer is accomplished by means of mechanism which transfers the successive rows laterally from the rapid conveyor and onto one end of the pasteurizer conveyor which travels in a direction away from the side of the fast conveyor. When the upright cylindrical beer laden containers are thus transferred onto the slow conveyor, they tend to topple over on their sides and also become staggered. This tipping or toppling of the containers is undesirable, and after the heat treated containers are delivered from the pasteurizing zone at the opposite end of the slow conveyor, they should be quickly and positively removed to another rapid conveyor. After cooling, the containers are ready for merchandizing, and it has been found that the rapid removal of the treated containers from the discharge end of the pasteurizing conveyor and the matter of maintaining the containers in upright condition, have introduced some difficult problems, especially when considering the fact that the capacity of a single line comprising a filler, closing machine and a pasteurizer is over two hundred containers per minute.

The present invention primarily contemplates provision of improved mechanism for effectively transferring the pasteurized packages from the slow conveyor to a final discharge conveyor, and secondarily contemplates the provision of other means for maintaining the containers in righted condition during pasteurization of the confined product.

More specifically defined, an object of the present invention is to provide improved transfer mechanism which is capable of transferring successive groups of objects such as metallic containers, from a slow conveyor upon which the objects are supported en masse, to a rapid conveyor whereon the groups are advanced in successive alined rows.

Another specific object of the invention is to provide improved magnetic means for bodily lifting successive rows of metallic objects from one type of transporting mechanism, and for depositing the rows in succession upon another type of conveyor, in a most effective manner.

Still another specific object of the invention is the provision of improved mechanism for alining successive groups of containers or the like into rows, preparatory to the transference thereof from one conveyor to another.

A further specific object of the invention is to provide improved instrumentalities for preventing toppling or undesirable displacement of cylindrical bodies while the same are being transferred in upright position from one conveyor to another.

An additional specific object of the invention is to provide improved container handling mechanisms which are simple and compact in construction, and which are moreover efficient and flexible in use.

These and other objects and advantages will be apparent from the following detailed description.

A clear conception of embodiment of the several features constituting the present improvement, and of the mode of constructing and of operating container handling mechanisms built in accordance with the invention, may be had by referring to the drawings accompanying and forming a part of this specification wherein like reference characters designate the same or similar parts in the various views.

Fig. 1 is a fragmentary top view of a pasteurizing and container conveying assemblage, showing the improved transfer mechanisms at the ends thereof;

Fig. 2 is a similar side elevation of the pasteurizer and container conveying assemblage, likewise showing the improved transfer devices;

Fig. 3 is an enlarged fragment of the elevation of Fig. 2, showing the improved magnetic transfer at the discharge end of the pasteurizer in the act of alining and removing a row of containers from the main conveyor;

Fig. 4 is a similar fragmentary view of the assemblage, showing the magnetic transfer in the act of depositing a row of the containers upon the final conveyor;

Fig. 5 is a wiring diagram showing the electrical circuits for actuating the magnetic transfer mechanism;

Fig. 6 is a further enlarged transverse section through the magnet of the transfer device, taken along the line 6—6 of Fig. 7;

Fig. 7 is a similarly enlarged front view of a fragment of the magnet and associated parts;

Fig. 8 is an enlarged side elevation of a fragment of the structure for maintaining the containers in upright position while they are being placed upon the main conveyor; and Fig. 9 is a similarly enlarged top view of the structure shown in Fig. 8.

While the invention has been shown and described herein as being specifically embodied in an assemblage for pasteurizing and conveying cylindrical metallic conveyors laden with beer, it is not desired to thereby unnecessarily restrict the scope by virtue of such specific embodiment. The containers may be of any desired shape and formed of any kind of magnetic material, and may also be loaded with any material other than beer. The magnetic transfer is also susceptible of considerable modification and the conveyors need not necessarily be associated with a pasteurizer.

Referring to the drawings, the assemblage shown in Figs. 1 and 2 thereof, comprises in general a pasteurizer 10 of well-known construction; a main endless conveyor 11 adapted to transport a plurality of beer laden cylindrical metallic containers 12 in upright position and en masse, through the pasteurizer at a relatively slow rate of speed; a container supply conveyor 13 disposed at the receiving end of the main conveyor 11 and traveling across the path of the latter at a relatively high rate of speed; a final container redelivery conveyor 14 disposed at the opposite or delivery end of the main conveyor 11 and also traveling across the path of the latter at a relatively high rate of speed; and improved mechanisms for transferring the beer laden containers 12 from the initial conveyor 13 to the conveyor 11 and from the conveyor 11 to the final conveyor 14.

As previously indicated, the pasteurizer 10 is of well known construction and operation, being adapted to heat treat the beer laden containers 12 after they have been hermetically sealed; and the containers 12 are transported through the heat treating chamber en masse, by the upper substantially horizontal run or stretch of the main conveyor 11. The main conveyor 11 is of the well known endless type comprising a series of slats 15 carried by chains 16 which coact with driving and supporting sprockets 17, and the upper object supporting stretch of this conveyor is supported by beams 18 as shown in Fig. 2.

The rapid supply conveyor 13 is also of rather well known construction, and this conveyor is adapted to transport the successive containers 12 single file, from the filling and closing machines, to a position such as shown in Fig. 1, directly adjacent to the receiving end of the main conveyor 11. A stationary horizontal plate 18 connects the upper deck or stretch of the initial conveyor 13 with the receiving end of the upper deck or stretch of the main conveyor 11; and the successive rows of containers 12 after reaching a position of alinement with the conveyor 11, are adapted to be pushed off of the conveyor 13 and over the plate 18 onto the conveyor 11, by means of an intermittently movable transfer bar 19 operable in any convenient manner. When the cylindrical containers 12 which are in upright position, are thus transferred over the edge of the plate 18 by the bar 19, they tend to tilt and topple over onto their sides, and in order to eliminate this tilting tendency, I have provided an improved device for maintaining the containers in upright position.

This improved device is shown generally in Figs. 1 and 2, and more in detail in Figs. 8 and 9, and comprises a guide plate 20 adjustably suspended over the discharge end of the container transfer plate 18 in such manner, that it will engage the tops of the containers 12 and will prevent possibility of their toppling over as they are deposited upon the moving conveyor 11. The plate 20 is disposed substantially horizontal and is carried by a cross-beam 21 suspended from fixed arms 22 by slotted bars 23, the lower ends of which are adjustably attached to the beam 21 by bolts 24, and the upper ends of which have slots 25 coacting with clamping bolts 26 in such manner that the plate 20 may be raised or lowered, or tilted so as to properly coact with containers 12 of various sizes. With this improved assemblage, the successive rows of containers 12 which are removed from the conveyor 13 and slid over the plate 18 by the transfer bar 19, are effectively maintained in upright position as they pass over the edge of the fixed plate 18 and onto the moving conveyor 11.

The rapid discharge conveyor 14 is likewise of relatively standard construction, and is adapted to transport the successive containers 12 single file, onto a revolving transfer disk 27 as shown in Fig. 1. The final conveyor 14 is spaced some distance from the delivery end of the main conveyor 11, and is disposed considerably beyond the end of the pasteurizer from which the cylindrical containers 12 are delivered en masse and in relatively staggered relation, but in upright condition. As the beer laden containers 12 are heat treated within and delivered from the pasteurizer 10, they must be removed from the main conveyor 11 and carried across the intervening gap to the single file conveyor 14, and this is accomplished automatically by my improved magnetic transfer device.

This improved transfer device is shown generally in Figs. 1 and 2, and more in detail in Figs. 3 to 7 inclusive, and comprises an elongated magnet 28 disposed above and extending across the path of movement of the containers 12 by the main conveyor 11; end carriages 29 associated with the opposite ends of the magnet 28 and movably supported on parallel fixed rails 30 by means of wheels 31; an electric motor 32 coacting with the carriages 29 through transmission mechanism 33, cranks 34 and connecting rods 35 to reciprocate the same along the rails 31; and mechanism carried by the carriages 29 for automatically alining the containers 12 in rows preparatory to removal thereof from the conveyor 11 by the magnet 28. The magnet 28 may be constructed as shown in detail in Figs. 6 and 7, and is adapted to be energized electrically by means of coils 36; and the pole faces 37 of the magnet 28 are disposed slightly above the plane of the tops of the metallic containers 12. In order to accommodate containers of various heights, the horizontal guide rails 30 may be made vertically adjustable in an obvious manner, and the rail 30 on one side should be provided with a cut-out 38 for permitting unobstructed delivery of the containers 12 by the conveyor 14 to the disk 27. The carriages 29 and the magnet 28 will obviously be moved back and forth along the rails 30, as the cranks 34 are revolved, and when the magnet 28 is in one extreme position of travel as shown in Fig. 3, it will be disposed above the main conveyor 11, whereas movement of the magnet 28 to the opposite extreme position as shown in Fig. 4 will position the same over and in alinement with the final conveyor 14.

The improved mechanism for automatically alining the containers 12 preparatory to removal thereof from the conveyor 11, comprises a pair of side arms or levers 39 swingably supported upon the carriages 29 by means of pivots 40; a transverse rod 41 connecting the lower ends of the levers 39; rollers 42 carried by the upper ends of the levers 39; and fixed cam tracks 43 with which the rollers 42 cooperate to swing the rod 41 from one extreme position to the other as indicated in Figs. 3 and 4. With this assemblage of elements, when the magnet 28 is in extreme forward position as shown in Fig. 3, the cam tracks 43 function to permit the rod 41 to swing downwardly and forwardly so as to perfectly aline a row of the adjacent containers 12, beneath the magnet 28, so that as the magnet is energized, the alined row will be lifted bodily from the conveyor 11 and suspended from the pole faces 37. When the carriages 29 are moved toward the conveyor 14, the levers 39 will be swung upwardly and rearwardly away from the suspended row of containers 12, by the coaction of the rollers 42 with the tracks 43, and the rod 41 will thus be elevated sufficiently to clear the tops of the containers 12 deposited upon the conveyor 14 by the magnet 28, during the return movement of the carriages 29, see Fig. 4.

While Fig. 5 illustrates one practical embodiment of electrical circuits for actuating the electro-magnets 28 and the motor 32 in order to effect automatic transfer of the successive rows of containers 12 from the main conveyor 11 to the final conveyor 14, other switch arrangements may be utilized to accomplish the same results. The motor 32 may be either of the alternating or direct current type, and as shown, is adapted to be operated from an alternating current line 44 through a main switch 45. The magnet 28 is adapted to be energized from a direct current line 46 through a main switch 47, and the strength of the magnet may be varied by means of variable resistance inserted in one of the leads of the line 46, or by controlling the generator voltage. These details of the electrical system are unimportant so far as the present invention is concerned, and the present description will therefore be confined to the actuation of the automatic switches which function to control the operation of the motor 32 and magnet 28 during normal use of the improved transfer device.

Referring to the diagram of Fig. 5, the operation of the motor 32 and magnet 28 is automatically controlled by means of three limit switches A, B and C, of which the switch A is mounted upon one of the cam tracks 43 and is operable by the corresponding roller 42, while the switches B and C are mounted either upon the same track 43 or upon the adjacent rail 30 and are operable by the adjacent carriage 29 in the following manner. The limit switch A is normally open and is closed by the roller 42 when the containers 12 have been properly alined along the rod 41 by the main conveyor 11 and have moved the levers 39 sufficiently to cause the roller to close the switch A. This closing of the switch A energizes the magnet coils 36 and causes the magnet 28 to lift the alined row of containers 12 therebeneath, away from the conveyor 11, whereupon the motor control switch 45 is simultaneously closed to cause the carriages 29 to move the magnet 28 and the suspended containers 12 away from the end of the conveyor 11 and toward the conveyor 14. When the magnet 28 reaches a position as shown in Fig. 4 directly above the conveyor 14, the carriage 29 opens the normally closed limit switch B, thereby deenergizing the coils 36 of the magnet 28 and causing the row of containers 12 to drop upon the advancing conveyor 14. The motor 32 then reverses the travel of the carriages 29 and magnet 28, carrying these elements forwardly toward the pasteurizer 10, and when the carriages reach their extreme forward position, the limit switch C which is normally closed, is opened and functions to stop the motor 32 until the conveyor 11 has again carried a row of containers 12 into alinement with the rod 41 and has actuated the limit switch A as above described. It will thus be noted, that the limit switches B and C which are operable by one of the carriages 29, the latter of which controls the actuation of the motor 32, are normally closed, while the limit switch A which controls the energization of the magnet 28 is open during the forward travel of the magnet 28.

During this reciprocation of the carriages and magnet, the rollers 42 associated with the levers 39, coact with the cam tracks 43 and function to lift the alining rod 41 during rearward travel of the magnet 28 and to retain this rod elevated above the plane of the tops of the containers 12 while the rod 41 travels over the final conveyor 14 in both directions. When the magnet 28 approaches its extreme forward position, the rollers 42 ride upwardly along the highest portions of the tracks 43, and the rod 41 then drops by gravity into alining position as shown in Fig. 3. This operation prevents the rod 41 from striking the containers 12 which are deposited upon the final conveyor 14, while permitting rapid return of the magnet 28 to forward position.

The normal operation of the improved apparatus should be clearly apparent from the foregoing description, and it will be noted that while the conveyors 13, 14 supply and discharge the containers 12, in single file rows, the main conveyor 11 is adapted to carry these containers en masse through the pasteurizer 10. The anti-tilting device at the receiving end of the main conveyor 11, functions to effectively prevent the cylindrical containers from toppling over, and maintains these containers in upright condition during transportation thereof through the pasteurizer 10. The automatic transfer device comprising the magnet 21 supported by the carriages 28, functions to rapidly and effectively transfer successive alined rows of the containers from the delivery end of the main conveyor 11 to the final rapidly moving conveyor 14. The improved transfer devices have proven highly successful in actual commercial operation in a system wherein over two hundred and fifty containers 12 are delivered from the closing machine, per minute, thus indicating the speed of operation which can be obtained with the use of the improved magnetic transfer assemblage. The improved transfer device is moreover extremely simple and compact in construction, and is positive and reliable in operation.

It should be understood that it is not desired to limit the invention to the exact details of construction and to the precise mode of operation herein shown and described, for various modifications within the scope of the claims may occur to persons skilled in the art.

I claim:

1. In combination, a conveyor for advancing metal containers in one direction, another conveyor for advancing containers in another direction, and magnetic means having opposed poles cooperable directly with the upper container surfaces for transferring containers from one of said conveyors to the other.

2. In combination, a conveyor for advancing successive transverse rows of loaded metal containers in one direction, another conveyor for advancing successive alined rows of loaded containers in another direction, and magnetic means having opposed poles cooperable directly with the uppermost container surfaces for transferring successive rows of said containers from one of said conveyors to the other.

3. In combination, a conveyor for advancing loaded metal containers en masse in a substantially horizontal plane and in a predetermined direction, a second conveyor disposed near the end of said first mentioned conveyor and traveling across the path thereof, and magnetic means having opposed poles cooperable directly with the tops of said containers and being operable to remove successive rows of said containers from said first mentioned conveyor and to deposit the same in succession upon said second conveyor.

4. In combination, a primary conveyor for advancing loaded containers en masse in a definite direction, a secondary conveyor movable across the path of said primary conveyor, magnetic means movable back and forth between said conveyors for removing successive rows of said containers from said primary conveyor and for depositing said rows in succession upon said secondary conveyor, and movable means engageable only with the sides of said containers facing said secondary conveyor for alining said containers into straight rows preparatory to such transfer thereof from one conveyor to the other.

5. In combination, a primary conveyor for advancing cylindrical vertically disposed metal containers in a predetermined direction, a secondary conveyor movable across the path of the delivery end of said primary conveyor and disposed adjacent said end, and movable means having opposed magnets cooperable directly with the top of each container for lifting prearranged rows of said containers away from said primary conveyor and for depositing said rows in succession upon said secondary conveyor.

6. In combination, a slowly movable conveyor for advancing containers, a rapidly movable conveyor, and means comprising a magnet cooperable directly but only with the tops of said containers for removing successive groups of containers from said slowly movable conveyor and for depositing said groups in succession upon said rapidly movable conveyor.

7. In combination, a slow conveyor for advancing loaded metallic containers en masse, a rapid conveyor movable across the end of the path of said slow conveyor, and a magnet having opposed poles cooperable only with the uppermost end portions of said containers for removing successive groups of the containers from said slow conveyor and for depositing said groups in succession upon said fast conveyor.

8. In combination, a slow conveyor for advancing loaded cylindrical metallic containers in upright position, means for intermittently delivering groups of said containers to one end of said conveyor, means for retaining said containers in righted position during such delivery, a rapid conveyor disposed near the opposite end of said slow conveyor, and a magnet cooperable only directly with the upper surfaces of said containers for intermittently transferring successive groups of said containers in righted position from said slow to said rapid conveyor.

9. In combination, laterally spaced parallel conveyors, an intermediate conveyor disposed between said parallel conveyors, means for transferring groups of loaded metallic containers from one of said conveyors onto the adjacent end of said intermediate conveyor, means for retaining the containers righted during said transference, and magnetic means for lifting successive groups of the containers from the opposite end of said intermediate conveyor and for depositing said groups in succession upon the other of said parallel conveyors.

10. In combination, a pair of laterally spaced rapid conveyors, a slow conveyor interposed between said rapid conveyors, means for transferring successive groups of cylindrical metallic containers from one of said rapid conveyors onto an end of said slow conveyor, means for retaining the containers in upright position during said transference, and means for lifting successive groups of the containers from the other end of said slow conveyor and for depositing said groups in succession upon the other of said rapid conveyors.

11. In combination, a pair of laterally spaced conveyors, a transverse conveyor interposed between said spaced conveyors, reversely movable means for transferring containers from one of said spaced conveyors onto an end of said transverse conveyor, means operable while said transferring means is in motion for alining the containers in rows at the other end of said transverse conveyor, and means for removing said rows of containers from said transverse conveyor and for depositing the same in succession upon the other spaced conveyor.

12. In combination, a pair of conveyors located adjacent each other, a magnet movable from one of said conveyors to the other, a motor for moving said magnet, means for actuating said magnet to remove containers in succession from one conveyor and for depositing the same upon the other conveyor, means for alining the containers in rows while said magnet is in motion, and means for interrupting the movement of said magnet during removal of said containers from said conveyor.

13. In combination, a pair of conveyors located adjacent each other, a magnet movable from one of said conveyors to the other, a motor for moving said magnet, means for actuating said magnet to remove containers in succession from one conveyor and for depositing the same upon the other conveyor, means carried by said magnet for alining the containers in rows while said magnet is in motion, and means for stopping said motor to arrest the movement of said magnet while the latter is lifting the containers from said conveyor.

14. In combination, a slow conveyor, a rapid conveyor disposed adjacent said slow conveyor, an electro-magnet for lifting containers off of said slow conveyor and for depositing the containers upon said rapid conveyor, a motor for moving said magnet from a position above said slow conveyor to a position above said rapid conveyor and vice versa, means for aligning the containers in rows while said magnet is in motion, and means for interrupting the movement of said magnet while the containers are being lifted off of said slow conveyor.

15. In combination, a slow conveyor, a rapid conveyor disposed adjacent said slow conveyor, an electro-magnet for lifting containers off of said slow conveyor and for depositing the containers upon said rapid conveyor, a motor for moving said magnet from a position above said slow conveyor to a position above said rapid conveyor and vice versa, means carried by said magnet for alining the containers in rows while said magnet is in motion, and means for stopping said motor while said magnet is lifting the containers off of said slow conveyor.

16. In combination, a primary conveyor adapted to transport cylindrical upright containers en masse, a secondary single file conveyor, a magnet for lifting successive rows of the containers off of said primary conveyor and for depositing said rows successively upon said secondary conveyor, a motor for transporting said magnet from one conveyor to the other, means for alining said containers in rows while said magnet is in motion, and means for arresting the movement of said magnet while the containers are lifted off of said primary conveyor.

17. In combination, a primary conveyor adapted to transport cylindrical upright containers en masse, a secondary single file conveyor, a magnet for lifting successive rows of the containers off of said primary conveyor and for depositing said rows successively upon said secondary conveyor, a motor for transporting said magnet from one conveyor to the other, means for alining said containers in rows during movement of said magnet and means for stopping said motor during removal of the containers from said primary conveyor.

LEO E. STEINER.